US009719658B2

(12) United States Patent
Maglica et al.

(10) Patent No.: US 9,719,658 B2
(45) Date of Patent: *Aug. 1, 2017

(54) LED FLASHLIGHT

(71) Applicant: Mag Instrument, Inc., Ontario, CA (US)

(72) Inventors: Anthony Maglica, Ontario, CA (US); Stacey H. West; John K. O'Farrell, Cave Creek, AZ (US)

(73) Assignee: MAG INSTRUMENT, INC., Ontario, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/287,176

(22) Filed: May 26, 2014

(65) Prior Publication Data
US 2015/0084540 A1 Mar. 26, 2015

Related U.S. Application Data

(63) Continuation of application No. 10/922,714, filed on Aug. 20, 2004, now Pat. No. 8,733,966.

(51) Int. Cl.
*F21V 7/06* (2006.01)
*F21L 4/02* (2006.01)
(Continued)

(52) U.S. Cl.
CPC .............. *F21V 7/06* (2013.01); *F21L 4/027* (2013.01); *F21V 14/045* (2013.01);
(Continued)

(58) Field of Classification Search
CPC ... F21L 4/027; F21L 4/00; F21L 4/045; F21L 4/022; F21V 7/06; F21V 14/045;
(Continued)

(56) References Cited

U.S. PATENT DOCUMENTS 4,080,571 A * 3/1978 Weisbrod ........... G01R 31/2632
324/762.07
4,286,311 A 8/1981 Maglica
(Continued)

FOREIGN PATENT DOCUMENTS

CN 2491693 Y 5/2002
CN 1419797 A 5/2003
(Continued)

OTHER PUBLICATIONS

PCT International Preliminary Report on Patentability, related to U.S. Appl. No. 11/227,768, Jul. 14, 2010.
(Continued)

*Primary Examiner* — Hargobind S Sawhney

(57) ABSTRACT

A lighting device with improved optical performance and efficiency is provided. The lighting device includes a source of energy, a light source, a reflector and a holder. The reflector has a first open end, a second end, and a parabolic profile extending between the first open end and second end. The focus of the parabolic profile is located outside of the profile. The reflector may also be movable relative to the light source. The lighting device may include a circuit that delivers a pulsed or thermally compensated pulsed current to the light source. The light device may also include a heat sink housing.

19 Claims, 14 Drawing Sheets

(51) Int. Cl.
*F21V 14/04* (2006.01)
*H05B 33/08* (2006.01)
*F21V 29/507* (2015.01)
*F21V 29/00* (2015.01)
*F21Y 115/10* (2016.01)
*F21V 29/70* (2015.01)

(52) U.S. Cl.
CPC .......... *H05B 33/0815* (2013.01); *F21V 29/20* (2013.01); *F21V 29/507* (2015.01); *F21V 29/70* (2015.01); *F21Y 2115/10* (2016.08)

(58) Field of Classification Search
CPC .. F21V 23/0414; F21V 23/0407; F21V 29/20; F21V 14/025; F21V 14/04; F21V 15/01; F21V 23/003; F21V 7/04; F21V 29/004; F21V 19/02; F21V 29/70; F21V 7/0075; F21Y 2101/02; F21Y 2101/00; F21Y 2115/10; H05B 33/0815; H05B 33/0845; H05B 33/0803; H05B 33/0818; H05B 33/0842; H05B 41/2828; H05B 37/02; H05B 33/0806; Y02B 20/03
See application file for complete search history.

(56) References Cited

U.S. PATENT DOCUMENTS

| | | | |
|---|---|---|---|
| 4,647,139 A | 3/1987 | Yang | |
| 4,656,565 A | 4/1987 | Maglica | |
| 4,683,519 A | 7/1987 | Murakami | |
| 4,823,242 A | 4/1989 | Maglica | |
| 4,851,974 A | 7/1989 | Maglica | |
| 5,213,408 A | 5/1993 | Shiau | |
| 5,459,649 A | 10/1995 | Ellion | |
| 5,485,360 A | 1/1996 | Maglica | |
| 5,549,481 A | 8/1996 | Morlion et al. | |
| 5,598,068 A | 1/1997 | Shirai | |
| 5,678,921 A * | 10/1997 | Kish | F21L 4/005 362/188 |
| 5,765,937 A | 6/1998 | Shiau | |
| 5,783,909 A | 7/1998 | Hochstein | |
| 5,801,490 A | 9/1998 | Fai | |
| 5,865,529 A | 2/1999 | Yan | |
| 5,974,064 A | 10/1999 | Uchida | |
| 5,975,714 A | 11/1999 | Vetorino et al. | |
| 6,046,572 A | 4/2000 | Matthews et al. | |
| 6,086,218 A | 7/2000 | Robertson | |
| 6,099,147 A * | 8/2000 | Ziegenfuss | F21L 4/045 362/158 |
| 6,127,784 A | 10/2000 | Grossman et al. | |
| 6,152,590 A | 11/2000 | Furst et al. | |
| 6,153,985 A | 11/2000 | Grossman | |
| 6,161,910 A | 12/2000 | Reisenauer et al. | |
| 6,168,288 B1 | 1/2001 | St. Claire | |
| 6,190,020 B1 | 2/2001 | Hartley | |
| 6,220,719 B1 | 4/2001 | Vetorino et al. | |
| 6,222,138 B1 | 4/2001 | Matthews et al. | |
| 6,249,089 B1 | 6/2001 | Bruwer | |
| 6,274,924 B1 | 8/2001 | Carey et al. | |
| 6,328,456 B1 | 12/2001 | Mize | |
| 6,345,464 B1 | 2/2002 | Kim et al. | |
| 6,376,994 B1 | 4/2002 | Ochi et al. | |
| 6,400,101 B1 | 6/2002 | Biebl et al. | |
| 6,406,196 B1 | 6/2002 | Uno et al. | |
| 6,408,824 B1 | 6/2002 | Pacucci et al. | |
| 6,411,046 B1 | 6/2002 | Muthu | |
| 6,439,738 B1 | 8/2002 | Matthews et al. | |
| 6,517,215 B2 | 2/2003 | Mele | |
| 6,540,377 B1 | 4/2003 | Ota et al. | |
| 6,585,391 B1 | 7/2003 | Koch et al. | |
| 6,622,416 B2 | 9/2003 | Kim | |
| 6,693,394 B1 | 2/2004 | Guo et al. | |
| 6,722,772 B2 | 4/2004 | Maglica | |
| 6,791,283 B2 | 9/2004 | Bowman et al. | |
| 6,808,287 B2 | 10/2004 | Lebens et al. | |
| 6,827,468 B2 | 12/2004 | Galli | |
| 6,828,739 B2 | 12/2004 | Bruwer et al. | |
| 6,841,941 B2 | 1/2005 | Kim et al. | |
| 6,841,947 B2 | 1/2005 | Berg-johansen | |
| 6,854,865 B2 | 2/2005 | Probst et al. | |
| 6,966,677 B2 | 11/2005 | Galli | |
| 6,974,234 B2 | 12/2005 | Galli | |
| 7,014,335 B2 | 3/2006 | Probst et al. | |
| 7,083,297 B2 | 8/2006 | Matthews et al. | |
| 7,091,874 B2 | 8/2006 | Smithson | |
| 7,114,831 B2 | 10/2006 | Popovich et al. | |
| 7,116,061 B2 | 10/2006 | Kim et al. | |
| 7,153,004 B2 | 12/2006 | Galli | |
| 7,220,016 B2 | 5/2007 | Matthews et al. | |
| 7,293,893 B2 | 11/2007 | Kim | |
| 7,296,913 B2 | 11/2007 | Catalano et al. | |
| 7,344,268 B2 | 3/2008 | Jigamian | |
| 7,393,120 B2 | 7/2008 | Kang et al. | |
| 7,543,961 B2 | 6/2009 | Arik et al. | |
| 7,549,765 B2 | 6/2009 | Kim et al. | |
| 7,579,782 B2 | 8/2009 | West | |
| 2001/0020546 A1 | 9/2001 | Eldridge et al. | |
| 2002/0014862 A1 | 2/2002 | Fregoso | |
| 2002/0135572 A1 | 9/2002 | Weindorf | |
| 2003/0035284 A1 | 2/2003 | Maglica | |
| 2003/0080691 A1 | 5/2003 | Yasuda et al. | |
| 2003/0107885 A1 | 6/2003 | Galli | |
| 2003/0189826 A1 | 10/2003 | Yoon | |
| 2004/0114393 A1 | 6/2004 | Galli | |
| 2004/0156202 A1 | 8/2004 | Probst et al. | |
| 2004/0190286 A1 | 9/2004 | Chapman | |
| 2005/0012698 A1 | 1/2005 | Takahashi | |
| 2005/0024864 A1 | 2/2005 | Galli | |
| 2005/0047161 A1 | 3/2005 | Tai | |
| 2005/0057187 A1 | 3/2005 | Catalano | |
| 2005/0122711 A1 | 6/2005 | Matthews et al. | |
| 2005/0237005 A1 | 10/2005 | Maxik | |
| 2006/0039139 A1 | 2/2006 | Maglica et al. | |
| 2006/0132323 A1 | 6/2006 | Grady | |
| 2007/0086189 A1 | 4/2007 | Raos et al. | |
| 2007/0091581 A1 | 4/2007 | Gisin et al. | |
| 2007/0159833 A1 | 7/2007 | Netzel, Sr. et al. | |
| 2007/0274096 A1 | 11/2007 | Chew et al. | |
| 2008/0099770 A1 | 5/2008 | Mendendorp et al. | |
| 2008/0158887 A1 | 7/2008 | Zhu et al. | |
| 2008/0232119 A1 | 9/2008 | Ribarich | |

FOREIGN PATENT DOCUMENTS

| | | |
|---|---|---|
| DE | 19810827 A1 | 9/1999 |
| EP | 1278402 A1 | 1/2003 |
| JP | U-H06-013002 | 2/1994 |
| JP | A-H08-212825 | 8/1996 |
| JP | A-H11-176405 | 7/1999 |
| JP | A-2002-075027 | 3/2002 |
| JP | A-2002-324685 | 11/2002 |
| JP | A-2003-331601 | 11/2003 |
| JP | A-2004-193031 | 7/2004 |
| JP | A-2004-214519 | 7/2004 |
| RU | 32744 U1 | 9/2003 |
| SU | 402095 | 2/1974 |
| TW | 483203 | 4/2002 |
| TW | 542110 | 7/2003 |
| TW | 586605 | 5/2004 |
| WO | WO 03/016778 | 7/2003 |

OTHER PUBLICATIONS

PCT International Preliminary Report on Patentability, related to U.S. Appl. No. 12/188,201, Jan. 21, 2011.
PCT International Search Report, related to U.S. Appl. No. 10/922,714, Oct. 4, 2007.
PCT International Search Report, related to U.S. Appl. No. 11/227,768, Jul. 30, 2008.
PCT International Search Report, related to U.S. Appl. No. 12/188,201, Nov. 30, 2009.

(56) References Cited

OTHER PUBLICATIONS

PCT Written Opinion, related to U.S. Appl. No. 10/922,714, Oct. 4, 2007.
PCT Written Opinion, related to U.S. Appl. No. 11/227,768, Jul. 30, 2008.
PCT Written Opinion, related to U.S. Appl. No. 12/188,201, Nov. 30, 2009.
PCT Written Opinion of IPEA, related to U.S. Appl. No. 12/188,201, Nov. 8, 2010.
Secondary Optics Design Considerations for Super Flux LEDs, Application Note 1149-5, Hewlett Packard, Sep. 1998.
Using Super Flux LEDs in Automotive Design Lamps, Application Note 1149-1, Hewlett Packard, 1999.

\* cited by examiner

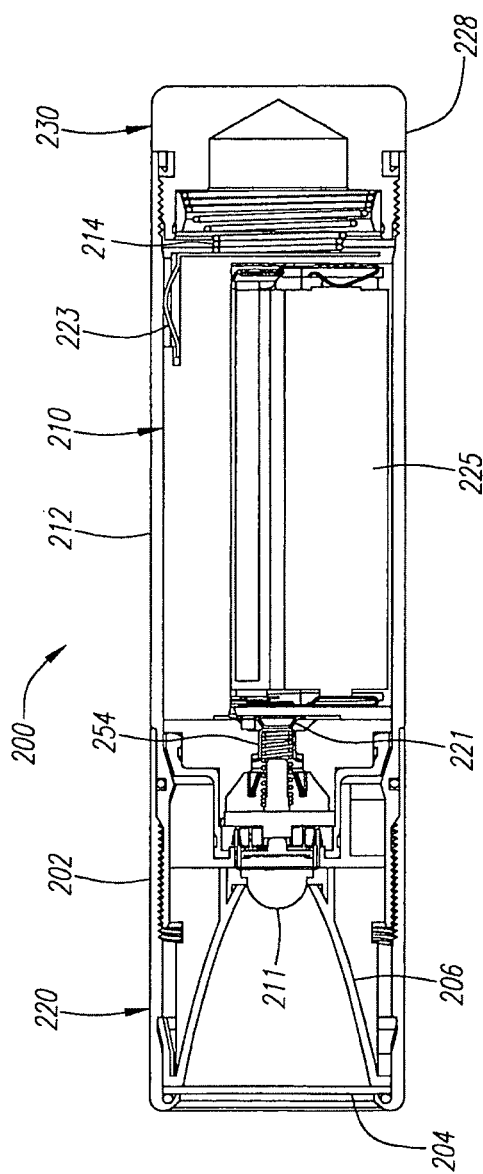
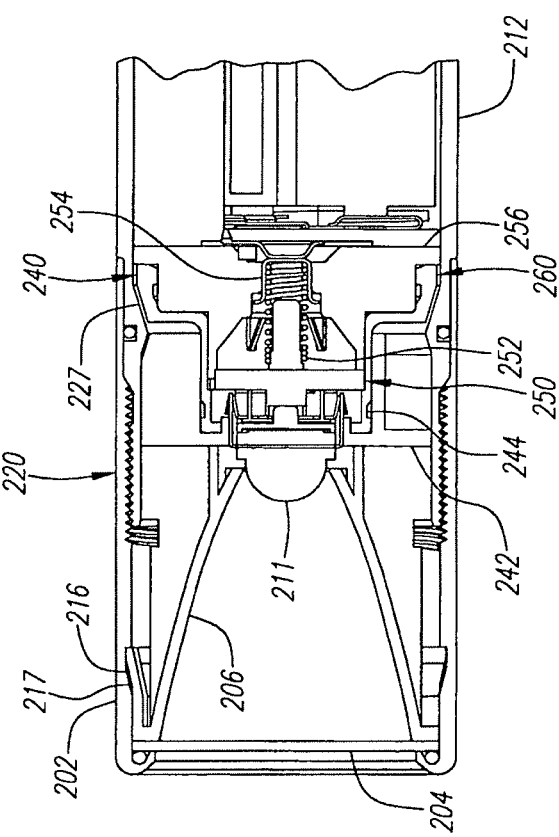
FIG. 14
FIG. 15

LED FLASHLIGHT

CROSS-REFERENCE TO RELATED APPLICATION

The application is a continuation of application Ser. No. 10/922,714, filed Aug. 20, 2004, the contents of which are incorporated by reference as if fully set forth herein.

FIELD OF THE INVENTION

The field of the present invention relates to handheld or portable lighting devices, including flashlights and flashlight components.

BACKGROUND OF THE INVENTION

Light emitting diodes ("LEDs") have been used in various applications including illuminating watches, transmitting information from remote controls, and forming images on jumbo television screens. More recently, LEDs have been used in portable lighting devices, such as flashlights, because, among other things, LEDs can last longer and can be more durable than incandescent lamps commonly used in conventional flashlights.

Notwithstanding the desirable characteristics LEDs may have over incandescent lamps, improvements can be made over existing lighting devices that use an LED as its primary source of light. For example, current LED flashlights typically fail to produce a quality light beam that projects for any appreciable distance. A reason for this is that available LED lamps substantially radiate light in a pattern over an angle less than 180° relative to the position of the LED. FIG. 1 illustrates the brightness or radiation pattern of a typical LED lamp. A typical LED lamp includes an LED and a lens arranged over the LED. The light rays that emanate from the typical LED lamp is generally conical—the brightness (indicated in percentages) is generally concentrated about the center axis 11 and reduces non-linearly as the spherical angle θ increases. Existing LED flashlights have not provided a reflector/lamp combination that effectively captures the brighter light rays that are concentrated about the center axis. Accordingly, although available LED lighting devices may be suitable to illuminate the immediate surrounding area, the distance that the light beam is able to project has been limited.

To try to overcome this deficiency, some devices have used multiple LEDs or a combination of LED lamps and incandescent lamps. However, such devices involve greater complexity, consume more energy, and cost more to manufacture. Accordingly, the present invention provides an energy efficient LED lighting device that has improved optical performance and that projects a quality light beam.

Also, as improvements are made to light sources, such as LEDs, another problem challenging the operation of portable lighting devices is effectively dissipating the increased heat that is generated by the light source. Accordingly, the present invention provides a combination that effectively dissipates heat from the light source of a portable lighting device. The present invention also provides a means to reduce the amount of heat generated by the light source and to use less energy to illuminate the light source.

SUMMARY OF THE INVENTION

The present invention involves a portable lighting device having an improved optical performance. The present invention also provides for improving the efficiency of a portable lighting device.

In one embodiment, the lighting device includes a source of energy, a light source, a reflector and a holder. The reflector has a first open end, a second open end, and a parabolic profile extending between the open ends. The reflector also has its focus located outside the parabolic profile, which, among other things, facilitate more effectively collimating the brighter light rays that radiate from the light source. The holder holds the light source relative to the reflector such that light generated by the light source is reflected by the reflector. The relative position of the light source and the reflector may be variable. In one embodiment of the invention, a unique energy source assembly is provided to hold batteries in a side-by-side arrangement.

Optionally, the parabolic profile of the reflector may substantially conform to a profile according to the equation $r^2 = 4\,fz$, wherein the focal length, i.e., the distance between the vertex and the focus, is between 0.020-0.050 or 0.035 inch. Alternatively, the ratio between the distance from the vertex to the smaller opening and the focal length is greater than 1.5:1, less than 6.5:1, between 1.5:1 to 6.5:1, 3.0:1 to 3.4:1, or 3.2:1. The light source may also be a lamp comprising an LED. The lighting device may also include a heat sink housing thermally coupled to the light source and a main housing. The lighting device may also include a current modulating circuit to deliver a pulsed current or a thermally compensated pulsed current to the light source.

In a flashlight, the invention includes a portable source of power, a light source, and a movable curved shaped reflector. The light source includes an LED and a lens, and light radiates substantially from the light source at an angle less than 180° relative to the LED position. The movable reflector includes a parabolic profile and a focus located outside the parabolic profile. Also, the reflector may be movable in a direction parallel to the principal axis of the parabola. The flashlight may also include a heat sink thermally coupled to the light source.

In another aspect of the invention, the flashlight includes a portable source of energy, an LED lamp, and an electrical circuit that includes a heat sink housing that electrically couples a first lead of the LED lamp and the portable source of energy. The heat sink housing is also thermally coupled to the LED lamp to substantially dissipate heat that is generated from the LED lamp.

In still another aspect of the invention, an improved energy source assembly includes batteries held in a side-by-side arrangement.

BRIEF DESCRIPTION OF THE DRAWINGS

FIG. 14 is a cross-sectional side view of the flashlight of FIG. 13 as taken through the plane indicated by 14-14.

FIG. 15 is an enlarged cross-sectional side view of the front end of the flashlight of FIG. 13 as taken through the plane indicated by 14-14.

DETAILED DESCRIPTION OF THE PREFERRED EMBODIMENTS

Figure 2:
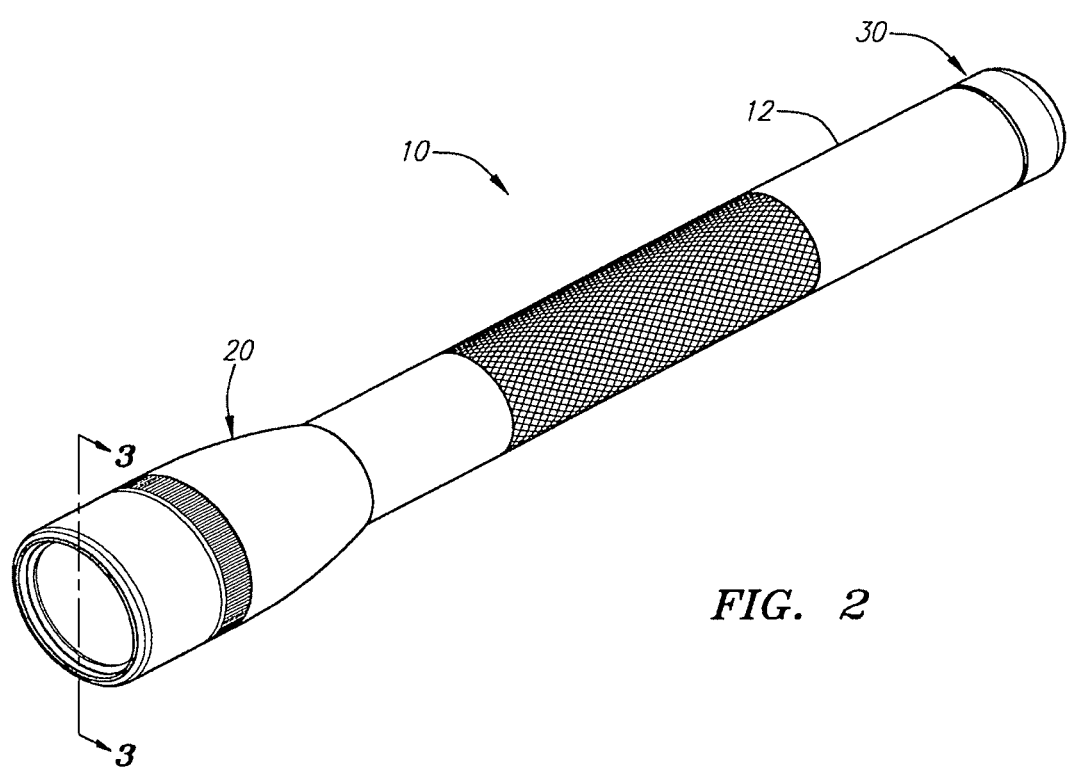
FIG. 2 is a perspective view of a flashlight in accordance with the present invention.
Figure 13:
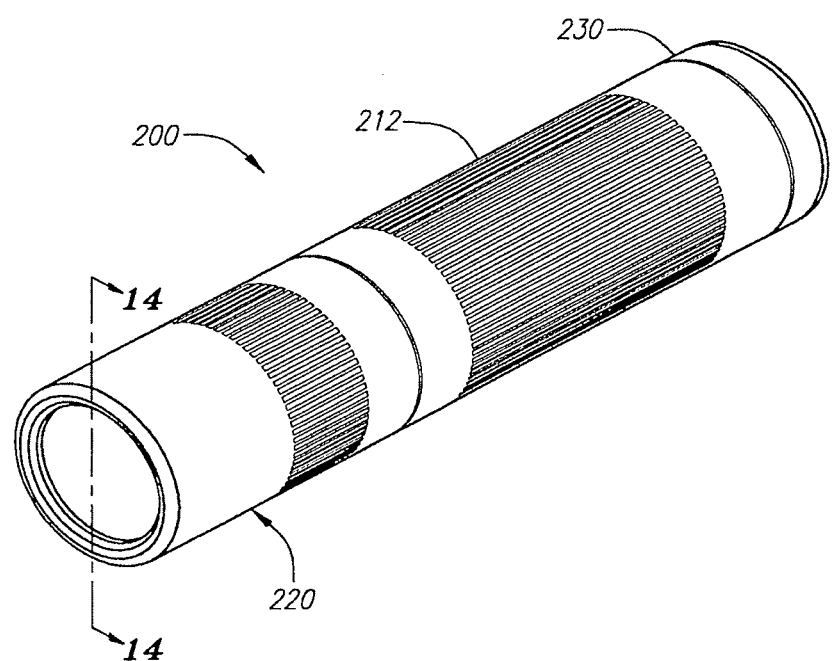
FIG. 13 is a perspective view of another embodiment of a flashlight in accordance with the present invention.

Referring to FIGS. 2 and 13, a portable lighting device in the form of flashlights 10 and 200, each an embodiment of the present invention, are illustrated in perspective. Each of flashlight 10 and flashlight 200 incorporates various features of the present invention. These features are described in detail below and illustrated in the accompanying figures for the purpose of illustrating the preferred embodiment of the invention. It is to be expressly understood, however, that the present invention is not restricted to the flashlights described herein. Rather, the present invention includes lighting devices that incorporate one or more of the various features of the invention. It is also to be understood that the present invention is directed to each of the inventive features of the lighting devices described below.

Figure 3:
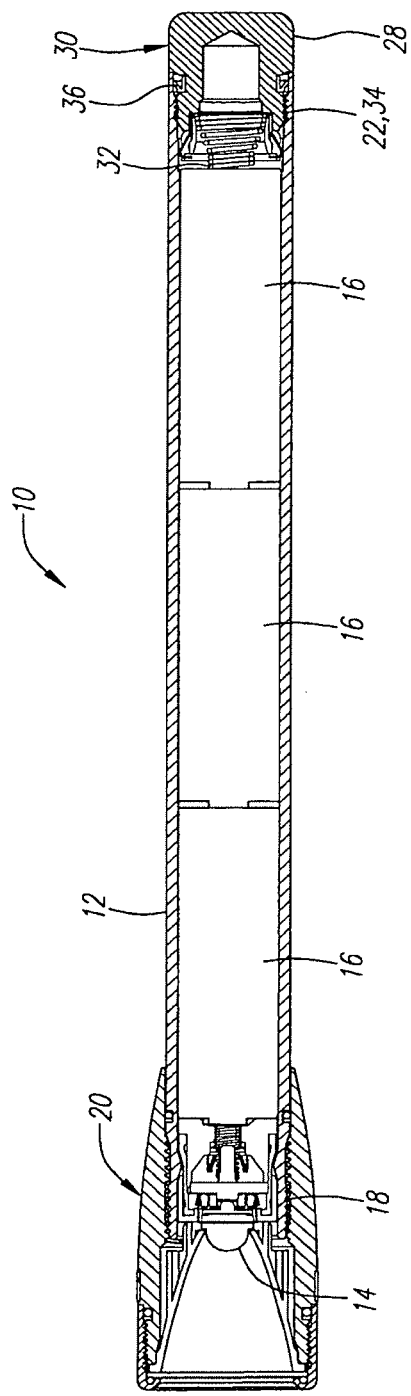
FIG. 3 is a cross-sectional side view of the flashlight of FIG. 2 as taken through the plane indicated by 3-3.

Referring to FIGS. 2 and 3, the flashlight 10 includes a head assembly 20, a barrel 12, a light source 14 and a tail cap assembly 30. The head assembly 20 and the light source 14 are disposed about the forward end of the barrel 12. The tail cap assembly 30 encloses the aft end of the barrel 12.

Figure 4:
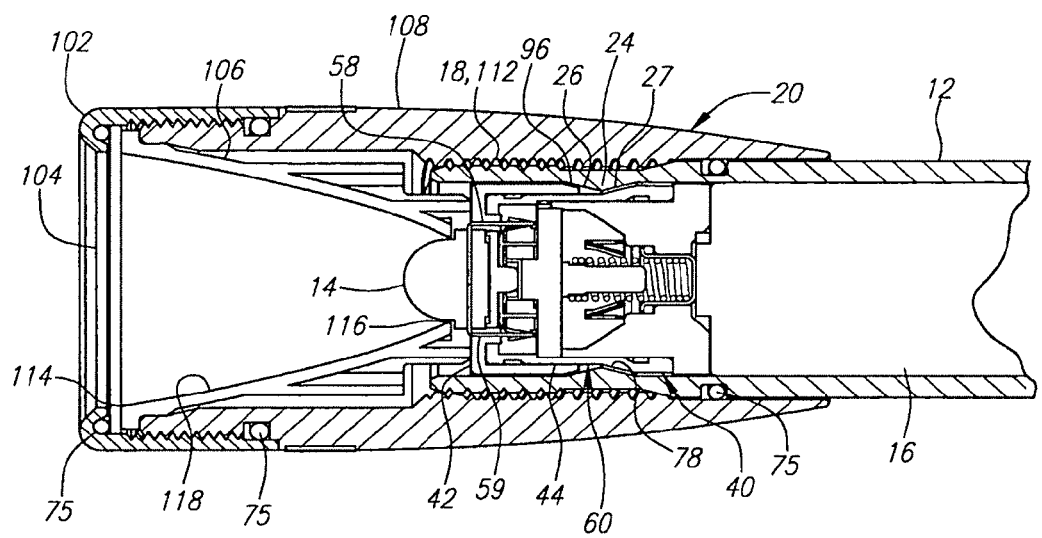
FIG. 4 is an enlarged cross-sectional side view of the front end of the flashlight of FIG. 2 as taken through the plane indicated by 3-3 where the flashlight is shown in the OFF position.

Referring to FIGS. 3 and 4, the barrel 12 is a hollow structure suitable for housing at least one source of energy, such as for example, a battery 16. In the illustrative embodiment, the barrel 12 includes forward threads 18 formed on the outer diameter of its front end, and aft threads 22 formed on the inside diameter of its aft end. The barrel 12 also includes a reduced diameter region 24 that includes a front taper 26 and an aft taper 27. In the illustrative embodiment, preferably three batteries 16 are disposed in the barrel 12 in a series arrangement. It will be appreciated by those skilled in the art, however, that barrel 12 may also be configured to include a single battery, two batteries, a plurality of more than three batteries, or other suitable portable source of energy in either a series or a side-by-side parallel arrangement. In a preferred embodiment, the batteries 16 are alkaline type dry cell batteries.

Figure 5:
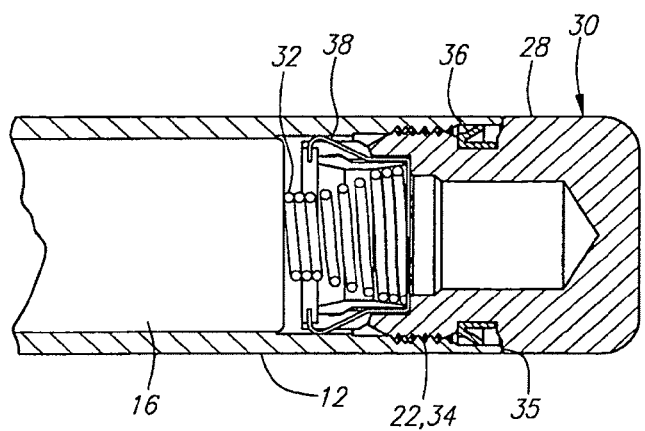
FIG. 5 is an enlarged cross-sectional side view of the back end of the flashlight of FIG. 2 as taken through the plane indicated by 3-3.

Referring to FIGS. 3 and 5, the tail cap assembly 30 includes a tail cap 28, a conductive spring member 32 and a tail cap contact 38. The tail cap 28 preferably includes a region of external threads 34 for engaging the matching aft threads 22 formed on the interior of the barrel 12. Those skilled in the art should recognize that other suitable means may be employed for attaching the tail cap 28 to the barrel 12.

A sealing element 36 may be provided at the interface between the tail cap 28 and the barrel 12 to provide a watertight seal. The sealing element 36 may be an O-ring or other suitable sealing devices. In a preferred embodiment, the sealing element 36 is a one-way valve that is orientated so as to prevent flow from the outside into the interior of the flashlight 10, while simultaneously allowing overpressure within the flashlight to escape or vent to the atmosphere. Radial spines 35 may be disposed at the interface between the tail cap 28 and the barrel 12 to ensure that the end of the barrel 12 does not provide a gas tight seal against the adjacent flange of the tail cap 28, thereby impeding the flow of overpressure gases from the interior of the flashlight.

The design and use of one-way valves in flashlights are more fully described in U.S. Pat. Nos. 5,003,440; 5,113,326; 5,207,502; 5,349,506; and 5,485,360, all issued to Anthony Maglica, which are hereby incorporated by reference.

Referring to FIG. 5, the tail cap contact 38 is disposed between the conductive spring member 32 and the tail cap 28. The conductive spring member 32 is electrically coupled to the tail cap contact 38 and the case electrode of the battery 16. The tail cap contact 38 is electrically coupled to the conductive spring member 32 and the barrel 12.

Figure 6:
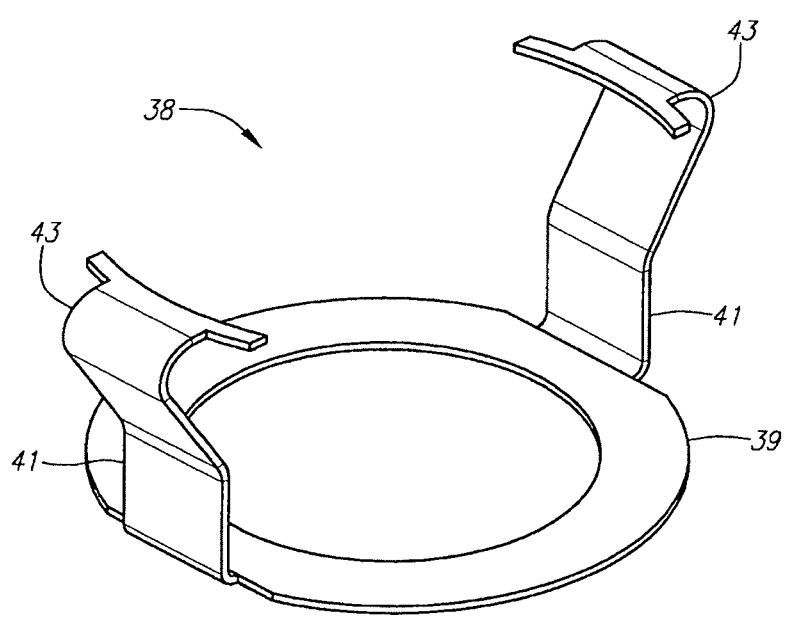
FIG. 6 is a perspective view of a tail cap contact.

Referring to FIG. 6, the tail cap contact 38 includes a ring 39 and two extensions 41. The two extensions 41 are generally positioned 180° apart and extend substantially perpendicular from the outer perimeter of the ring 39. Each of the extensions 41 also includes a profile 43 that extends radially outward from the outer perimeter of the ring 39. Because of the profile 43, the extensions 41 frictionally engage and electrically couple with the inside diameter of the barrel 12 when the tail cap assembly 30 is assembled with the barrel 12. In this way, the illustrative embodiment discloses one way of providing an electrical connection between the battery 16 and the barrel 12 without the tail cap 28 conducting any electricity. Accordingly, if desired, the tail cap 28 may be fabricated from a non-conductor, such as plastic or rubber.

In an alternate embodiment, a tail cap insert may be used to provide an electrical connection between the battery 16 and the barrel 12. Such an insert is shown or described in U.S. Pat. Nos. 4,819,141; 4,823,242; 4,864,474; 5,003,440; 5,008,785; 5,113,326; 5,121,308; 5,193,898; 5,207,502; 5,267,130; 5,349,506; 5,455,752; 5,485,360; 5,528,472; 5,722,765; 5,836,672; and 6,086,219, which are hereby incorporated by reference.

In an alternate embodiment, a conductive sleeve within the barrel can engage the extensions 41 of the tail cap contact 38 to provide an electrical path. Such a sleeve is described in U.S. Pat. Nos. 4,656,565 and 4,851,974 to Anthony Maglica, which are hereby incorporated by reference. In an alternate embodiment, a conductive strip within the barrel can engage the extensions 41 to provide an electrical path. Such a strip is shown in U.S. Pat. No. 6,585,391. Such a sleeve or strip will permit the barrel to be fabricated from a non-conductor, such as plastic or rubber.

In another alternate embodiment, the tail cap assembly 30 may be configured without a tail cap contact 38 and the tail cap 28 is used as an electrical conductor. In this alternate embodiment, when the tail cap assembly 30 is installed onto the barrel 12, the spring member 32 forms an electrical path between the case electrode of the battery 16 and the tail cap 28. An electrical path is further formed between the tail cap 28 and the barrel 12 through, for example, their interface and/or the mating threads. To facilitate the flow of electricity, any existing surface treatments, such as by anodizing, disposed at the tail cap/barrel contact is removed. Accordingly, in this alternate embodiment, the tail cap 28 is a conductor, such as aluminum.

Referring to FIG. 3, regardless of the tail cap assembly embodiment employed, the conductive spring member 32 urges the batteries 16 toward the front of the flashlight 10. As a result, the center electrode of the rear battery is in electrical contact with the case electrode of the battery forward thereof. In this way, the batteries 16 contained in the barrel 12 are electrically coupled. Referring to FIG. 4, the center electrode of the forward-most battery 16 is urged into contact with a switch assembly 40.

Referring to FIG. 4, the switch assembly 40 is disposed about the forward end of the barrel 12 and, among other things, holds the light source 14 relative to a reflector. The light source 14 includes a first electrode 58 and a second electrode 59.

The light source 14 may be any suitable device that generates light. For example, the light source 14 may be an LED lamp, an incandescent lamp, or an arc lamp. In the illustrative embodiment, the light source 14 is preferably an LED lamp that substantially radiates light at a spherical angle of less than 180°. A suitable light source 14 is an LED emitter LXHL-PWO1, manufactured by Lumileds Lighting, San Jose, Calif.

The switch assembly 40 includes features to hold the light source 14. Also, among other things, the switch assembly 40 includes features that facilitate closing and interrupting an electrical circuit to the light source 14. The switch assembly 40 also includes features that effectively dissipates heat generated by the light source 14.

Figure 7:
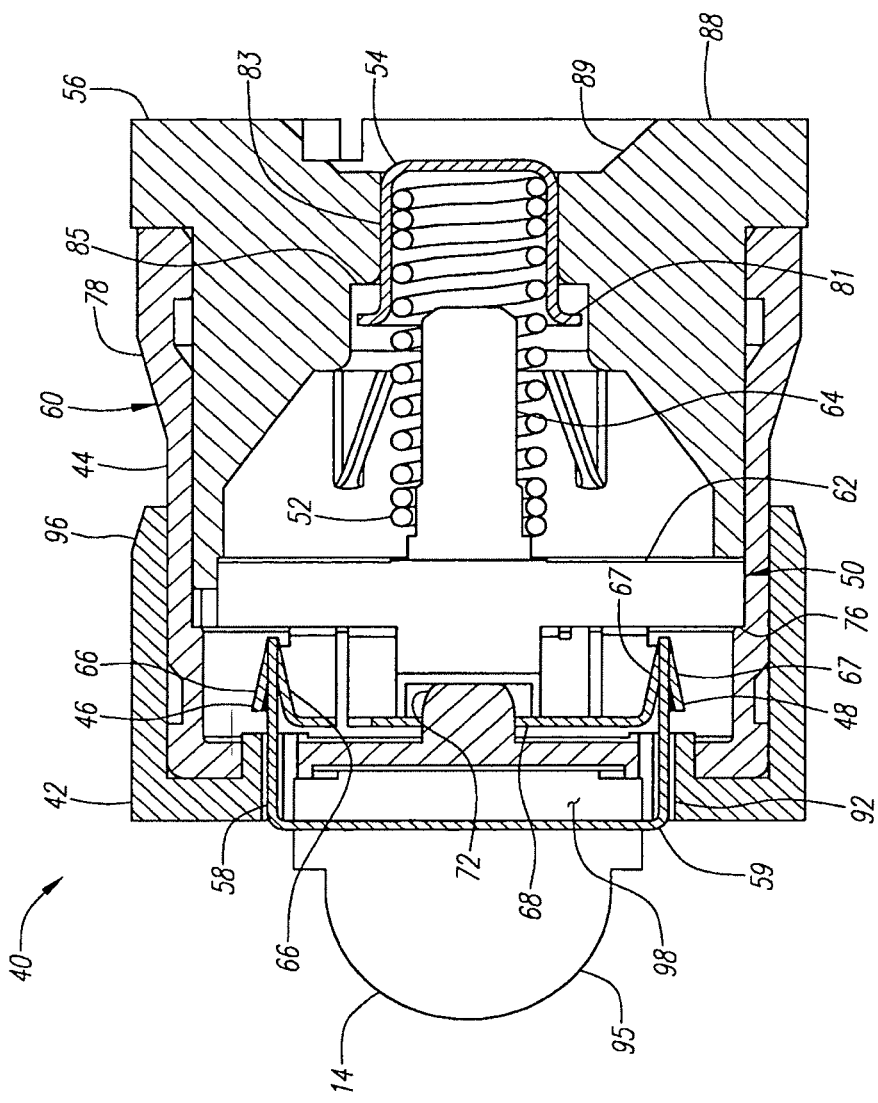
FIG. 7 is a cross-sectional view of the switch assembly in isolation.

Referring to FIG. 7, the switch assembly 40 includes an upper insulator 42 and a switch subassembly 60. The switch subassembly 60 includes a heat sink housing 44, a circuit assembly 50, an upper conductive spring member 52, a source contact 54 and a lower insulator 56.

The circuit assembly 50, among other things, preferably controls the energy that flows to the light source 14. In an illustrative embodiment, the circuit assembly 50 includes a circuit board 62, a contact plug 64, a first contact 46 and a second contact 48.

The circuit board 62 includes a current modulating circuit suitable for controlling the current that is delivered to the light source 14. Preferably, the current modulating circuit modulates the DC current from the batteries 16 to a pulsed current. Also preferably, the duty cycle of the pulsed current delivered to the light source 14 is automatically adjusted, if necessary, according to the heat that is generated by the light source 14.

Figure 8A:
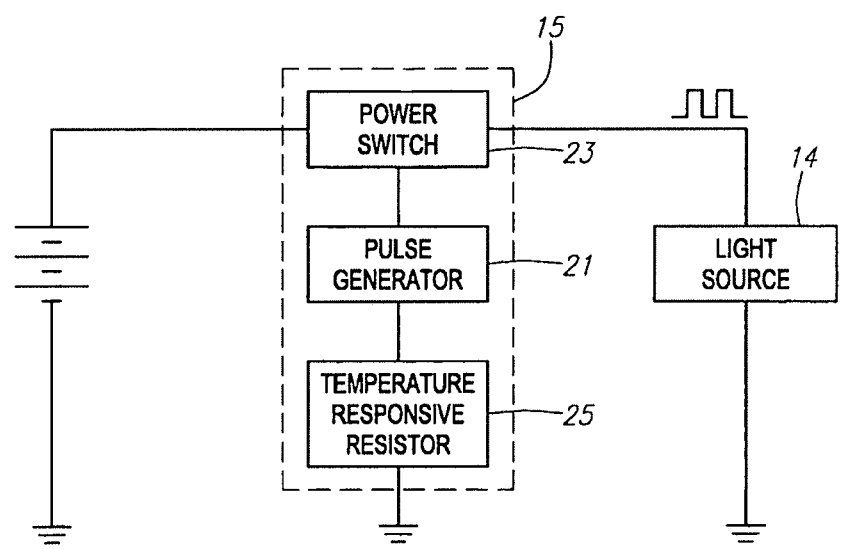
FIG. 8A is a block diagram of a current modulating circuit.

Referring to FIG. 8A, an illustrative embodiment of a current modulating circuit 15 is illustrated in block form. When the flashlight is turned ON and electrical energy is delivered to the current modulating circuit 15, the pulse generator 21 controls the power switch 23 to regulate the current that is delivered to the light source 14. In a preferred embodiment, the power switch 23 is a metal-oxide semiconductor field effect transistor ("MOSFET") with the pulse generator 21 coupled to its gate. The power switch 23 may be other suitable devices such as, for example, a transistor or a bi-polar junction transistor. Also, in a preferred embodiment, the pulse generator 21 is a circuit comprising a comparator and a system of diodes and resistors.

Figure 8B:
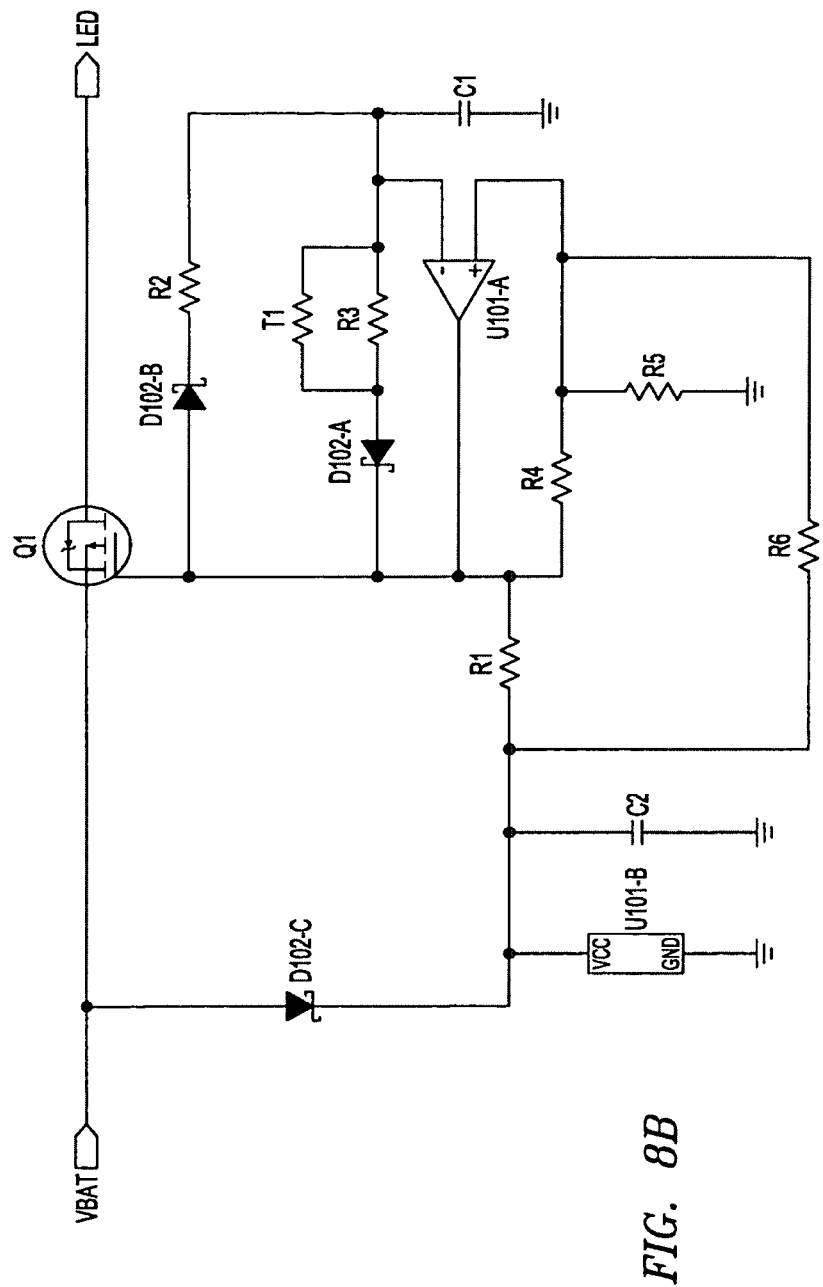
FIG. 8B is a schematic of one embodiment of a current modulating circuit.

The current modulating circuit 15 further includes a temperature responsive resistor 25 that detects the heat generated by the light source 14. In a preferred embodiment, the temperature responsive resistor 25 is a thermistor. The thermistor may be disposed such that the heat generated by the light source 14 may be detected. The thermistor may be coupled to the pulse generator 21 to adjust the duty cycle of the pulsed current that is delivered to the light source. For example, when the thermistor detects that the light source's temperature is too high, the duty cycle of the pulsed current is reduced to avoid overheating the light source. Also, if the thermistor detects that the light source's temperature is too low, the duty cycle of the pulsed signal is increased to ensure that the light source 14 produces light having adequate luminous intensity and consistent color. FIG. 8B, illustrates a schematic of one embodiment of a current modulating circuit 15 according to the present invention, wherein the thermistor is indicated as T1.

Powering the light source 14 by a thermally compensated pulsed current signal has several advantages overpowering by a DC signal. Among others, a pulsed current signal reduces the amount of heat generated by the light source 14 thereby extending the life of the light source. Also, a pulsed current signal expends less energy over time thereby extending the life of the batteries. Further, a pulsed current signal allows higher peak current to be supplied to the light source thereby improving the brightness that the light source may generate. By adjusting the energy delivered to the light source according to the heat generated by the light source 14, heat damage to the light source may be prevented.

Also, although the power circuit disclosed herein makes use of a MOSFET, a pulse generator, and a thermistor, the present invention is not limited to a circuit including the combination of electronic components disclosed herein. Those skilled in the art will recognize that other circuit designs, such as a circuit that includes a microprocessor and a look-up table, may also be used to deliver a pulsed current signal or a temperature adjusted pulsed current signal to the light source.

Referring back to FIG. 7, the electrical connection from the current modulating circuit 15 on the circuit board 62 and the light source 14 is facilitated by the first contact 46 and the second contact 48. The first and second contacts are preferably selectively soldered onto the circuit board 62. The first and second contacts are also disposed to receive the electrodes 58, 59 of the light source 14.

The first contact 46 is configured to frictionally receive the first electrode 58 of the light source 14. In the illustrative embodiment, the first contact 46 includes a pair of flexible angled surfaces 66 to receive the first electrode 58. Other suitable methods or configurations for establishing an electrical connection between conductors may also be used. For example, the first electrode 58 may be electrically connected to the first contact 46 by soldering.

The second contact 48 is configured to frictionally receive the second electrode 59 of the light source and to electrically couple with the heat sink housing 44. In the illustrative embodiment, the second contact 48 includes a pair of flexible angled surfaces 67 and a connecting member 68 electrically connected to the angled surfaces 67. The pair of flexible angled surfaces 67 receive the second electrode 59. Other suitable methods or configurations for establishing an electrical connection between conductors may also be used. For example, the second electrode 59 may be electrically connected to the second contact 48 by soldering.

The connecting member 68 of the second contact 48 electrically couples the second contact 48 to the heat sink housing 44. In the illustrative embodiment, the connecting member 68 frictionally engages with a heat sink plug 72 of the heat sink housing 44. Other suitable methods or configurations for establishing an electrical connection between conductors may also be used.

The first contact 46 and the second contact 48 may be made from a sheet of a conductor material that is formed to the desired configuration. To facilitate the shaping/forming of the sheet of conductor material, relief cuts in the conductor sheet may be employed. In a preferred embodiment, the first and second contacts are made from a sheet of copper alloy.

Still referring to FIG. 7, the contact plug 64 of the circuit assembly 50 is disposed on the circuit board 62 on the side opposite to where the first contact 46 and the second contact 48 are located. The contact plug 64, among other things, facilitates electrically coupling the batteries 16 to the current modulating circuit 15. In the illustrative embodiment, the contact plug 64 is selectively electrically coupled to the current modulating circuit 15. The contact plug 64 is also configured to receive the upper conductive spring member 52.

Figure 9:
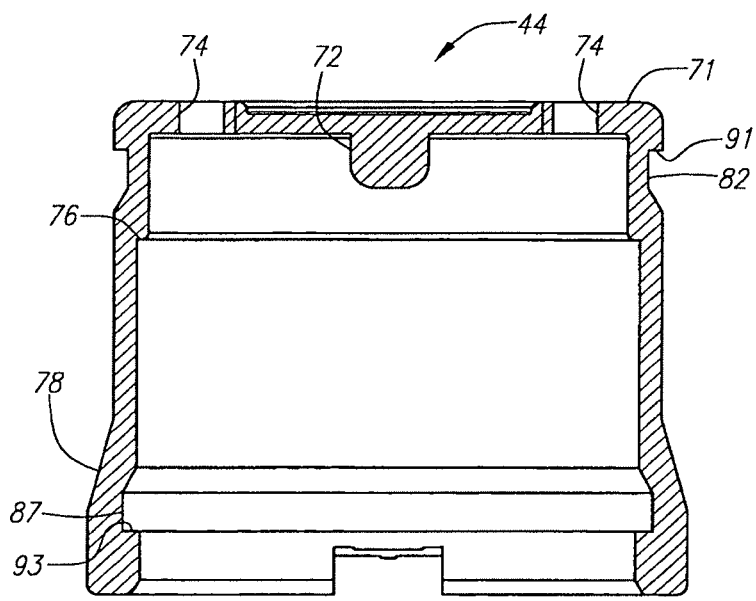
FIG. 9 is a cross-sectional view of a heat sink housing.

The circuit assembly 50 is disposed in the heat sink housing 44. Referring to FIG. 9, in one embodiment, the heat sink housing 44 is generally a hollow cylinder with a closed end. The heat sink housing 44, among other things, thermally couples the light source 14 and the barrel 12, and electrically couples the second electrode 59 of the light source 14 to the barrel 12. By utilizing the heat sink housing 44 and the barrel 12 to absorb and/or dissipate heat that is generated by the light source 14, the flashlight 10 more effectively protects the light source 14 from being damaged due to heat. Preferably, the heat sink housing 44 is a conductor, such as aluminum.

Referring to FIGS. 7, 9, 11 and 12, the heat sink housing 44 includes the heat sink plug 72, a front face 71, a pair of openings 74, an inside shoulder 76, an outer taper 78, a front snap-in groove 82, and an aft snap-in groove 87. The two openings 74 extend through the front face 71 and are sized to provide access for the electrodes of the light source 14 to couple with the first and second contacts 46, 48 of the circuit assembly 50. The front snap-in groove 82 includes a shoulder 91 that is generally perpendicular to the axis of the heat sink housing 44. The front snap-in groove 82 serves to receive locking tabs 84 of the upper insulator 42. The aft snap-in groove 87 includes a shoulder 93 that is generally perpendicular to the axis of the heat sink housing 44. The aft snap-in groove 87 serves to receive lock tabs 79 of the lower insulator 56.

The inside shoulder 76 of the heat sink housing 44 is sized and positioned to receive the circuit assembly 50. The outer taper 78 of the heat sink housing 44 is preferably tapered at an angle substantially equal to the angle of the aft taper 27 of the barrel 12 (shown in FIG. 4). The outer taper 78 of the heat sink housing 44 is also sized so that once disposed in the barrel 12, the axial movement of the heat sink housing 44, and consequently, the switch assembly 40, will be limited by the aft taper 27 of the barrel 12.

Referring to FIG. 7, the upper spring member 52 electrically couples the contact plug 64 and the source contact 54. In the illustrative embodiment, the upper spring member 52 is a coil spring that has an inside diameter sized to fit over the contact plug 64. The aft end of the upper spring member 52 is received by the source contact 54.

The source contact 54 electrically couples the upper spring member 52 and the battery 16. In the illustrative embodiment, the source contact 54 is an open-ended receptacle with a flange 81 depending from the open end of the receptacle. In a preferred embodiment, the source contact 54 is a conductor such as, for example, copper alloy.

Figure 11:
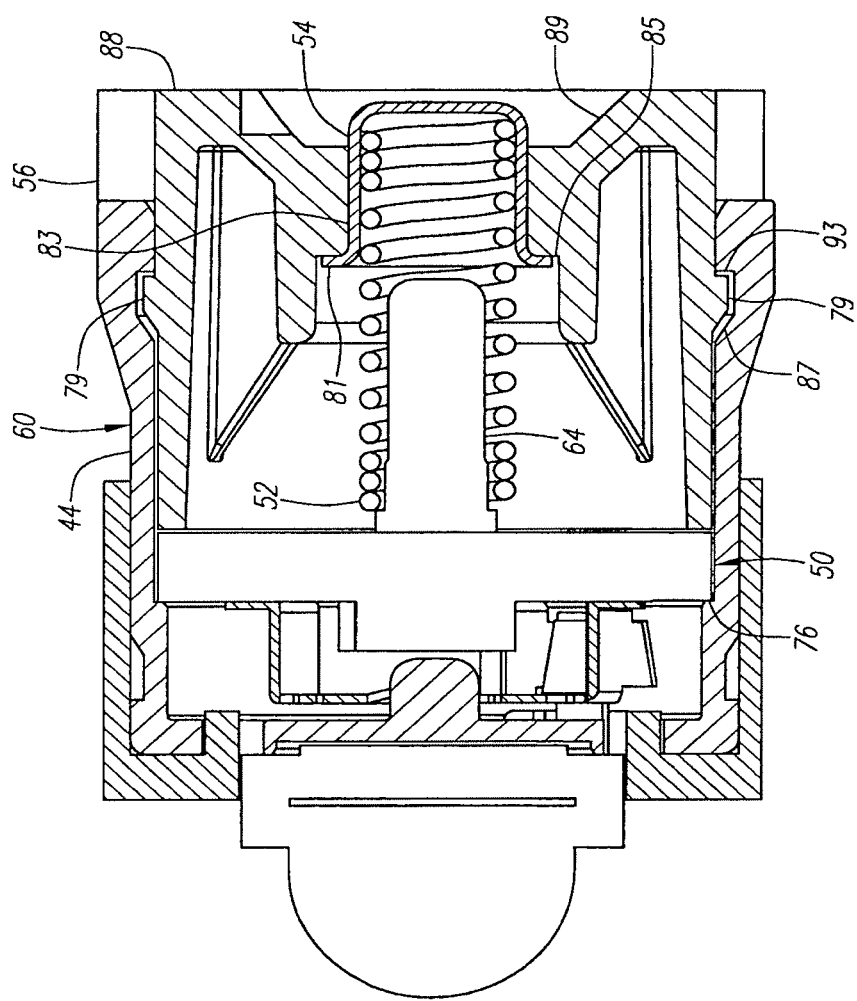
FIG. 11 is a cross-sectional view of the switch assembly of FIG. 7 rotated to show lock tabs.

Referring to FIGS. 7 and 11, the lower insulator 56, among other things, contains the circuit assembly 50, the upper conductive spring member 52, and the source contact 54 in the heat sink housing 44. The lower insulator 56 includes lock tabs 79, a back face 88, a recess 89, a through hole 83 and a counterbore shoulder 85. FIG. 7 shows the source contact flange 81 lifted off the lower insulator shoulder 85. FIG. 11 shows the source contact flange 81 in contact with the lower insulator shoulder 81. In a preferred embodiment, the lower insulator is a non-conductor such as, for example, plastic.

Referring to FIG. 11, the lower insulator 56 is secured to the heat sink housing 44 by the lock tabs 79 fitting into the aft snap-in groove 87 and being confined by the shoulder 93. The circuit assembly 50 is received in the inside shoulder 76 of the heat sink housing 44. The front end of the upper spring member 52 fits over the contact plug 64 of the circuit assembly 50. The aft end of the upper spring member 52 is received by the source contact 54. The source contact 54 is slidably disposed in the through hole 83 of the lower insulator 56. The flange 81 of the source contact 54 rests against the counterbore shoulder 85 which limits the axial displacement of the source contact 54 in the aft direction. Assembled this way, the upper spring member 52 biases the circuit assembly 50 forward against the inside shoulder 76 of the heat sink housing 44. The upper spring member 52 also biases the source contact 54 in the aft direction against the counterbore shoulder 85 of the lower insulator 56.

Preferably, the axial length of the source contact 54 is sized so that its closed end is always forward of the back face 88 and remains within the envelope defined by the recess 89 of the lower insulator 56. In the illustrated embodiment, the recess 89 is a frustoconical cavity with the base facing the back of flashlight 10. The recess 89 is dimensioned to be deeper than the height of the battery's center electrode that extends beyond the battery casing.

Arranged this way, when the battery 16 is urged forward against the back face 88 of the lower insulator 56, the center electrode of the battery 16 engages with the source contact 54 and lifts its flange 81 off the lower insulator's counterbore shoulder 85 as shown in FIG. 7. Concurrently, the upper spring member 52 urges the source contact 54 in the rearward direction against the battery's center electrode to achieve a spring biased electrical connection with the battery 16. In this way, the switch subassembly 60 provides a simple configuration that enhances the electrical coupling between components even when the flashlight is jarred or dropped, which may cause the battery or batteries 16 to suddenly displace axially within the barrel 12. Further, because the upper spring member 52 may absorb impact stresses due to, for example, mishandling, the battery's center electrode and the flashlight components, for example the circuit assembly 50, are better protected.

Also, because the closed end of the source contact 54 is forward of the back face 88, if a battery or batteries 16 are inserted backwards into the barrel 12 so that their case electrodes are directed forward, no coupling with the source contact 54 is formed. When the batteries are inserted correctly, the center electrode of the forwardmost battery is urged into contact with the source contact 54 and compresses the upper spring member 52. Such an arrangement serves to immediately notify the user of improper battery installation, and may further protect the flashlight's electronics from being affected or damaged by reverse current flow. In another embodiment for protecting the flashlight's electronics from reverse current flow, a diode may be selectively arranged in an electrical circuit. FIG. 8B, illustrates a schematic of one embodiment of such a circuit wherein diode D102-C prevents reverse current flow should the batteries be installed improperly.

Thus, the structure and the assembly of the switch subassembly 60 has now been described. Referring to FIGS. 3 and 4, the switch subassembly 60 is disposed generally on the forward end of the barrel 12. Absent further assembly, the switch subassembly 60 is urged forward by the action of the conductive spring member 32 until the outer taper 78 of the heat sink housing 44 comes into contact with the aft taper 27 of the barrel 12.

Figure 12:
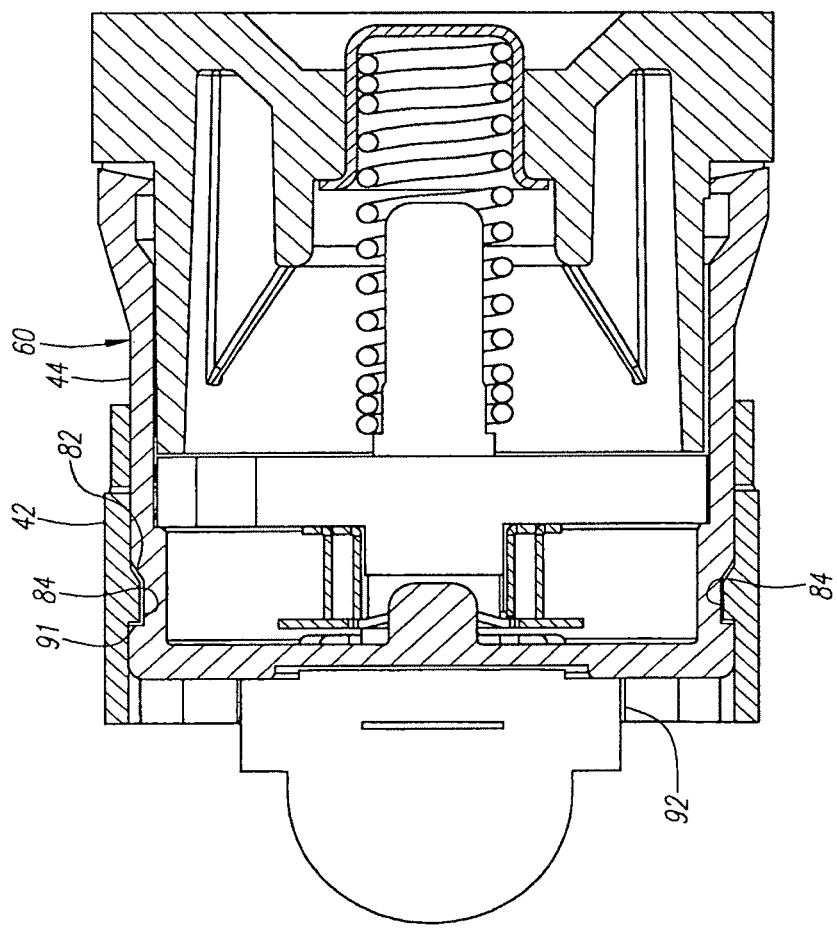
FIG. 12 is a cross-sectional view of the switch assembly of FIG. 7 rotated to show locking tabs.

Referring to FIGS. 4 and 12, the upper insulator 42 attaches to the switch subassembly 60 and, among other things, limits axial movement of the switch subassembly 60 in the rearward direction beyond a predetermined distance. The upper insulator 42 attaches to the switch subassembly 60 at the front snap-in groove 82 of the heat sink housing 44.

Referring to FIGS. 7 and 12, the upper insulator 42 includes locking tabs 84, a center clearance 92 and a taper 96. The center clearance 92 is sized to provide the light source 14 and its electrodes 58, 59 clearance to be secured onto the heat sink housing 44. The taper 96 corresponds to the front taper 26 of the barrel 12. Referring to FIG. 12, each of the locking tabs 84 is sized to fit into the front snap-in groove 82 and be confined by the shoulder 91 in the forward direction. Referring to FIG. 4, by securing the upper insulator 42 to the switch subassembly 60, which is disposed in the barrel 12, the upper insulator 42 keeps the switch subassembly 60 from falling to the rear of barrel 12, and potentially out the back end of the flashlight, in the absence of batteries 16 being installed in the flashlight 10. In a preferred embodiment, the upper insulator 42 is a nonconductor such as, for example, plastic.

Referring to FIG. 7, the light source 14 is thermally coupled to the heat sink housing 44 and electrically coupled to the circuit assembly 50. In the illustrative embodiment, the light source 14 includes the first electrode 58, the second electrode 59, a lamp 95, and a slug 98. The slug 98 of the light source 14 secures to the heat sink housing 44 to facilitate transfer of heat generated by the light source 14 to the heat sink housing 44. Preferably, a layer of thermally conductive adhesive is applied between the slug 98 and the heat sink housing 44. Also, because the slug 98 may not be electrically neutral, the thermally conductive adhesive is preferably an electrical insulator. The first and second electrodes 58, 59 frictionally engage with the first and second contacts 46, 48, respectively.

Referring to FIG. 4, the head assembly 20 is disposed on the forward end of barrel 12. The head assembly 20 includes a face cap 102, a lens 104, a reflector 106, and a sleeve 108. The reflector 106 and the lens 104 are rigidly held in place by the face cap 102 which is threadedly coupled with the sleeve 108. The sleeve 108 includes threads 112 formed on its inside diameter that engages with the forward threads 18 of the barrel 12. Arranged this way, the reflector 106 may displace in the axial direction of the flashlight 10 by rotating the head assembly 20 relative to the barrel 12.

Reflectors have been used with portable lighting devices to redirect light and to increase the distance that the light is able to project. The reflector has a highly reflective surface that is intended to reflect the light rays from a light source and form a beam. A parabolic profiled reflector is preferred because a parabola has the optical characteristic of collecting light rays emanating from its focus or focal point and reflecting them as a collimated beam, parallel to the principal axis of the parabola. By collimating the light rays, the otherwise dispersed light rays are arranged to form a light beam that can be projected an appreciable distance.

Figure 1:
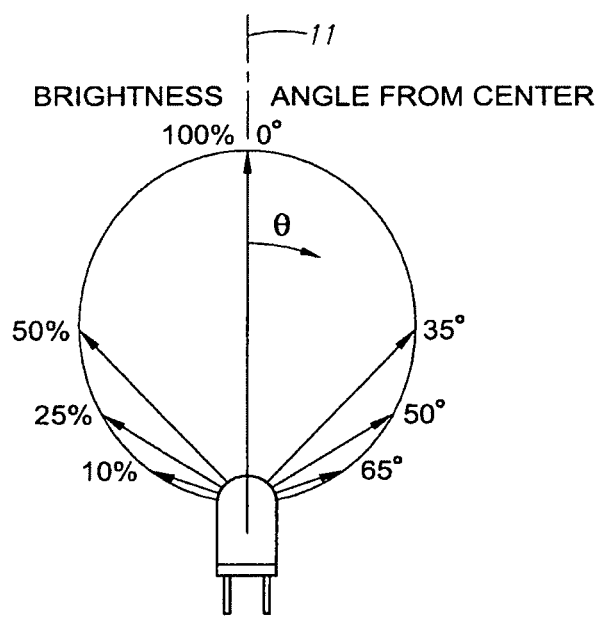
FIG. 1 is a plan view of a brightness or radiation pattern of a typical LED lamp.

Despite the utilization of a reflector, LED lighting devices, in particular, continue to be limited in the distance that the light beam is able to project. This is because an effective combination of properly configured parts is needed to effectively capture the light produced by available LED lamps that substantially radiates spherically over an angle less than 180°. Although some LED lamps claim to have a radiation pattern that is substantially greater than 180°, many LED lamps have little (less than 10% of the maximum light intensity) or no light radiation beyond 180° or, referring to FIG. 1, little or no light radiation for $\theta > 90°$.

Figure 10:
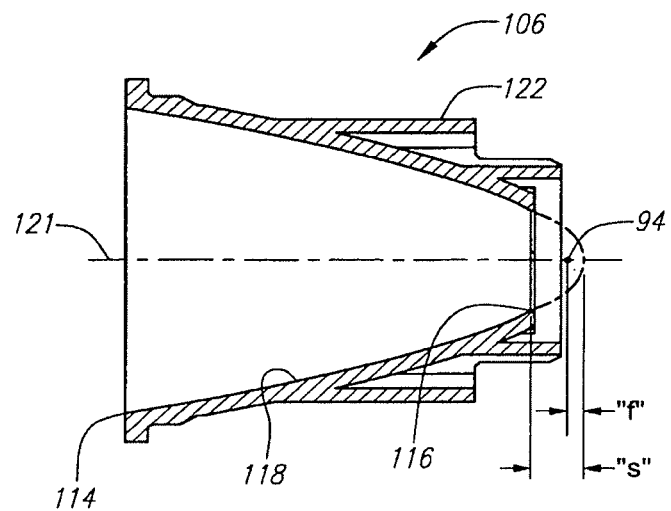
FIG. 10 is a cross-sectional view of a reflector.

Referring to FIGS. 4 and 10, the reflector 106 has a first end 114, a second end 116, a profile 118, and a support 122. In the illustrative embodiment, the first end 114 is suitable for emitting a beam of light, and the second end 116 is an opening that defines the end of the profile 118. In a preferred embodiment, the profile 118 is a segment of a parabola having a reflective surface that is axisymmetrical about its principal axis 121.

Referring to FIG. 10, the second end 116 is located such that the focal point 94 of the parabola is disposed outside the reflective surface of the profile 118. The profile 118 preferably conforms to a parabolic shape according to the equation $r^2 = 4\,fz$, wherein "r" is the radius of the parabolic profile normal to the axis 121, "f" is the focal length, or the distance from the vertex of the parabola to the focus or the focal point, and "z" is the distance along the axis 121.

In a preferred embodiment, dimension "f" is less than 0.080 inch, 0.020-0.050 inch, or 0.035 inch. Also, in a preferred embodiment, the distance between the vertex and the second end 116 (see "s" shown in FIG. 10) is 0.080-0.130 inch, 0.109-0.115 inch, or 0.112 inch; the first open end 114 has a diameter of 0.7-0.8 inch or 0.741-0.743 inch; and the second open end 116 has a diameter of 0.2-0.3 inch or 0.247-0.253 inch. Further in the preferred embodiment, the ratio between the distance of the second end from the vertex and dimension "f" is greater than 1.5:1, less than 6.5:1, between the range of 1.5:1 to 6.5:1, 3.0:1 to 3.4:1, or 3.2:1. Moreover, in the preferred embodiment, the ratio between the distance of the first end from the vertex and dimension "f" is greater than 20:1, less than 40:1, between the range of 25:1 to 30:1, or 28:1.

The illustrative reflector 106, among other things, more effectively collects light rays that radiate in a generally conical form or that has brightness intensity that is generally centrally concentrated such as that produced by a conventional LED lamp. By defining the focal length and configuring the reflector as described herein, a narrower or a deeper parabolic profile is achieved that facilitates capturing more light radiating from the light source. A parabolic profile collimates light most effectively, when the light radiates from a theoretical point positioned at the focus. The deeper parabolic profile also serves to make the light source appear more like a point to the reflective surface. The disclosed reflector facilitates collecting and reflecting light rays that do not substantially radiate uniformly spherically. In these ways, the reflector 106 advantageously produces an improved and collimated light beam that projects for distance.

The illustrative flashlight 10 described above is also one embodiment for axially moving the light source 14 relative to the reflector 106. By rotating the head assembly 20 relative to the barrel 12, the head assembly 20 travels along the forward threads 18 of the barrel 12 and causes the reflector 106 to axially displace relative to the light source 14. By varying the axial position of the light source 14 with respect to the reflector, the flashlight 10 advantageously varies the dispersion of light produced by the light source. In this way, the flashlight 10 can produce spot lighting, i.e., a collimated light beam, as well as flood lighting, i.e., a wide dispersion of light. Although the embodiment described above uses mating threads to effectuate relative axial displacement between the reflector and the light source, other suitable means, such as for example, a cam or guide may be utilized.

In a preferred implementation of the illustrative embodiment, the tail cap 28, the barrel 12, the face cap 102 and the sleeve 108, generally forming the external surfaces of the flashlight 10 are manufactured from aircraft quality, heat treated aluminum, which may be selectively anodized. The non-conductive components are preferably made from polyester plastic or other suitable material for insulation and heat resistance. The reflective profile 118 of the reflector 106 is preferably a segment of a computer-generated parabola that is metallized to ensure high precision optics. Optionally, the reflective profile 118 may include an electroformed nickel substrate for heat resistance.

Although the embodiment disclosed herein illustrates a substantially planar lens 104, the flashlight 10 may instead be combined with lens that include curved surfaces to further improve the optical performance of the flashlight 10. For example, the lens may include a biconvex profile or a plano-convex profile in the whole or part of the lens surface.

A sealing element, such as an O-ring 75, may also be incorporated at the interface between the face cap 102 and the lens 104, the face cap 102 and the sleeve 108, and the sleeve 108 and the barrel 12 to provide a watertight seal.

The electrical circuit of flashlight 10 will now be described. Referring to FIGS. 3, 4, 5 and 7, the electrical circuit of flashlight 10 is shown in the open or OFF position. The electrical circuit closes, or is in the ON position, when the head assembly 20 is rotated to sufficiently translate the switch assembly 40 in the forward direction so that the outer taper 78 of the heat sink housing 44 electrically couples with the aft taper 27 of the barrel 12. Once the circuit is closed, electrical energy is conducted from the rear battery through its center contact which is in connection with the case electrode of the battery disposed forward thereof. Electrical energy is then conducted from the forwardmost battery to the source contact 54 of the circuit assembly 50. The electrical energy then selectively conducts through the electronics of the circuit assembly 50 and to the first electrode 58 of the light source 14. After passing through the light source 14, the electrical energy emerges through the second electrode 59 which is coupled to the second contact 48 of the circuit assembly 50. The second contact 48 is electrically coupled to the heat sink housing 44, which is electrically coupled to the barrel's aft taper 27. The barrel 12 is coupled to the tail cap contact 38, which is in electrical contact with the conductive spring member 32. Finally, the conductive spring member 32 of the tail cap assembly 30 completes the circuit by electrically coupling with the case electrode of the rearmost battery. In this manner, an electrical circuit is formed to provide electrical energy to illuminate the light source.

Referring to FIG. 4, to open the electrical circuit of flashlight 10, the user rotates the head assembly 20 to translate the switch assembly 40 in the aft direction until the outer taper 78 of the heat sink housing 44 separates from the aft taper 27 of the barrel 12.

Although a rotating type switch that opens and closes the electrical circuit at the barrel/heat sink housing taper interface has been described, the electrical circuit may be closed or opened at other locations. Moreover, although a rotating type switch has been described, the various aspects of the invention as described herein is not limited by the type of switching scheme employed. Other suitable switch device, such as a push-button switch or an electronic switch may be employed.

Turning to FIGS. 13 and 14, flashlight 200 is an alternate embodiment of the present invention. Flashlight 200 includes several components that are functionally equivalent to the components described above for flashlight 10. Flashlight 200 includes a head assembly 220, a barrel 212 and a tail cap assembly 230. The head assembly 220 includes a head 202, a lens 204 and a reflector 206. The tail cap assembly 230 includes a tail cap 208, and a spring member 214. The head assembly 220 and tail cap assembly 230 are each threadably engaged to the barrel 212

Referring to FIG. 15, the reflector 206 includes a flexible tab 216, and the head 202 includes a locking groove 217. The reflector 206 is secured to the head 202 by inserting the flexible tab 216 into the locking groove 217 with the lens 204 interposed between the reflector 206 and a front flange of the head 202. The flashlight 200 also includes a switch assembly 240 that includes an upper insulator 242 and a switch subassembly 260. The switch subassembly 260 includes a heat sink housing 244, a circuit assembly 250, an upper conductive spring member 252, a source contact 254, and a lower insulator 256. The switch assembly 240 is assembled employing snap-fit features as described above. The switch assembly 240 is disposed on the forward end of the barrel 212. The light source 211 is received by the heat sink housing 244 and thermally coupled thereto and to the barrel 212. The electrodes of the light source 211 are selectively electrically coupled to the circuit assembly 250.

Figure 16A:
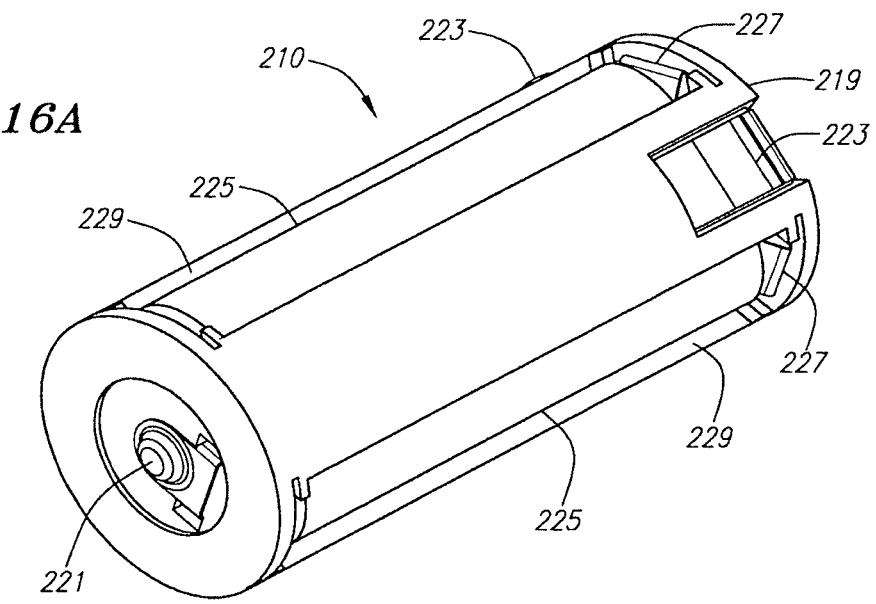
FIG. 16A is a front perspective view of an energy source assembly in isolation.
Figure 16B:
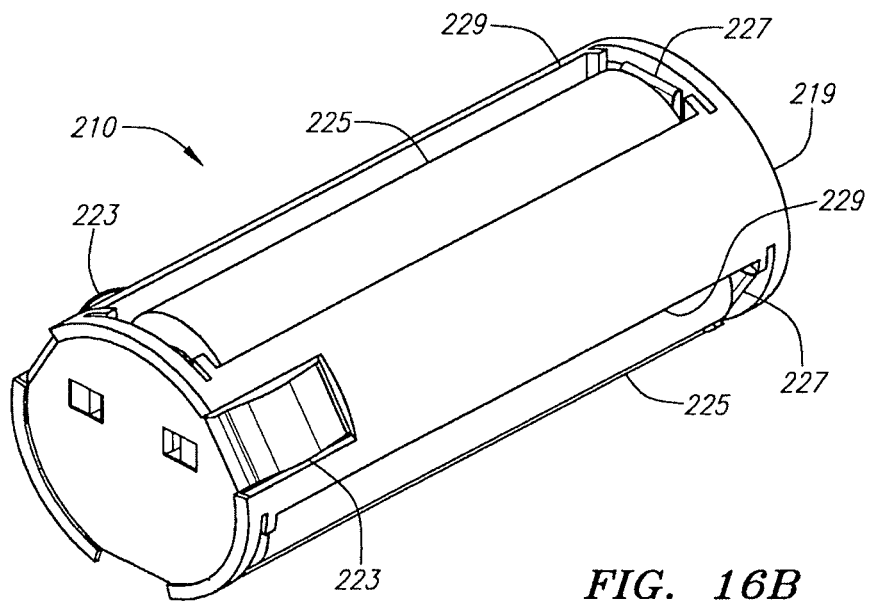
FIG. 16B is a back perspective view of an energy source assembly in isolation.

Referring to FIG. 14, the flashlight 200 also includes an energy source assembly 210 for illuminating the light source 211. In a preferred embodiment, the energy source assembly 210 holds a plurality of energy sources in a side-by-side arrangement. Referring to FIGS. 16A and 16B, the energy source assembly 210 includes a housing 219, conductors 227, a forward contact 221, radial contacts 223 and sources of energy, such as for example batteries 225. The housing 219 includes receptacles 229 to receive the batteries 225. The conductors 227 are selectively disposed in the housing 219 to electrically couple the batteries 225 in either a series or parallel circuit arrangement. In the preferred embodiment, the batteries 225 are electrically coupled in a series circuit arrangement. The terminals of the series circuit are coupled to the forward contact 221 and the radial contacts 223.

Referring to FIGS. 14, 16A and 16B, the energy source assembly 210 is sized to be disposed in the barrel 212. The forward contact 221 couples with the source contact 254. The radial contacts 223 are disposed about the outer feature of the housing 219 and extend radially outward therefrom. Configured this way, when the energy source assembly 210 is installed in the barrel 212, the radial contacts 223 engage and electrically couple with the barrel 212. Although the illustrative embodiment includes three radial contacts 223, the present invention is not limited by the number of radial contacts. For example, the energy source assembly 210 may include a single radial contact. Also, although the radial contacts 223 are illustrated disposed generally in the aft end of the energy source assembly 210, the radial contacts 223 may be disposed at other locations for establishing an electrical connection between the batteries 225 and the barrel 212.

Because the energy source assembly 210 directly couples the batteries 225 to the barrel 212, the tail cap assembly 230 is not used to conduct electricity. Accordingly, if desired, the tail cap assembly 230, including the tail cap 228 and the spring member 214 may be fabricated from a non-conductor or a poor conductor.

Referring to FIGS. 14 and 15, the electrical circuit of flashlight 200 is opened and closed by rotating the head assembly 220. The electrical circuit is closed when the switch assembly 240 is translated and the heat sink housing 244 is caused to electrically couple with a taper 227 of the barrel 212. Once the circuit is closed, electrical energy is conducted from the energy source assembly 210 to the source contact 254 and to the circuit assembly 250. Electrical energy then flows through the light source 211, the heat sink housing 244 and to the barrel 212. The barrel is electrically coupled to the radial contact 223 of the energy source assembly 210 to complete the circuit. In this manner, an electrical circuit is formed to provide electrical energy to illuminate the light source 211.

To open the electrical circuit of flashlight 200, the user rotates the head assembly 220 to translate the switch assembly 240 in the aft direction until the heat sink housing 244 separates from the taper 227 of the barrel 212.

Thus, a novel portable light emitting combination and device has been shown and described. While preferred embodiments of the herein invention have been described, numerous modifications, alterations, alternate embodiments, and alternate materials may be contemplated by those skilled in the art and may be utilized in accomplishing the various aspects of the present invention. It is envisioned that all such alternate embodiments are considered to be within the scope of the present invention as described by the appended claims.

What is claimed is:

1. A flashlight comprising: a source of energy; an LED light source coupled to said source of energy by an electrical circuit; and a reflector that reflects light emanating from said LED light source, said reflector including a first open end, a second end, and a parabolic profile extending between said first open end and said second end; wherein the electrical circuit includes a switch assembly having a substantially hollow heat sink housing that holds said LED light source relative to said reflector such that light generated by said LED light source is reflected by said reflector; and wherein the substantially hollow heat sink housing forms part of the electrical circuit and thermally conducts heat from the LED light source.

2. A flashlight of claim 1, wherein the relative position of said LED light source and said reflector is variable.

3. A flashlight of claim 1, wherein said first open end is larger than said second end, wherein the ratio between the distance of the second end from the vertex of said parabolic profile and the distance of the focus from the vertex of said parabolic profile is between 2.5:1 and 6.5:1.

4. A flashlight of claim 1, wherein said first open end is larger than said second end, wherein the ratio between the distance of the second end from the vertex of said parabolic profile and the distance of the focus from the vertex of said parabolic profile is between 3.0:1 and 3.4:1.

5. A flashlight of claim 1, wherein said first open end is larger than said second end, wherein the ratio between the distance of the second end from the vertex of said parabolic profile and the distance of the focus from the vertex of said parabolic profile is 3.2:1.

6. A flashlight of claim 1, wherein said parabolic profile substantially conforms to a profile according to the equation $r^2=4fz$, wherein "r" is the radius of the parabolic profile normal to the axis of the reflector, "f" is the distance between the focus and the vertex of said parabolic profile set at 0.035 inch, and "z" is the distance in the reflector axis direction.

7. A flashlight of claim 1, wherein said LED light source substantially radiates light at an angle of less than 180° degrees.

8. A flashlight of claim 1 further including a head assembly coupled to a main housing, wherein said reflector is mounted to said head assembly, wherein said main housing contains said source of energy, and wherein rotating said head assembly relative to said main housing opens or closes an electrical path between said source of energy and said LED light source.

9. A flashlight of claim 1 further including a main housing, wherein said heat sink housing thermally couples said LED light source to said main housing.

10. A flashlight of claim 9, wherein said heat sink housing electrically couples said LED light source to said main housing.

11. A flashlight of claim 1, further comprising a main housing that forms part of the electrical circuit, and wherein the switch assembly thermally conducts heat from the LED light source to the main housing.

12. A flashlight of claim 11, wherein said switch assembly forms part of the electrical circuit between the LED light source and the main housing.

13. A flashlight of claim 1, further including a circuit for delivering a thermally compensated signal to said LED light source.

14. A flashlight of claim 1, further including a tail cap, a main housing and an energy source assembly, wherein said tail cap attaches to said main housing, wherein said main housing receives said energy source assembly, wherein said energy source assembly receives said source of energy and electrically couples said source of energy to said main housing without conducting electricity through said tail cap.

15. A flashlight comprising: a source of energy; an LED light source coupled to said source of energy by an electrical circuit; a reflector for reflecting light from said LED light source including a first open end, a second open end, and a parabolic profile extending between said first open end and said second open end, said first open end adapted to emit a light beam; wherein said first open end is larger than said second end, wherein the ratio between the distance of the second end from the vertex of said parabolic profile and the distance of the focus from the vertex of said parabolic profile is greater than 2.5:1; and a switch assembly having a substantially hollow heat sink housing that holds the LED light source relative to the reflector such that light generated by the LED light source is reflected by the reflector; wherein the substantially hollow heat sink housing forms part of the electrical circuit and thermally conducts heat from the LED light source.

16. A flashlight of claim 15, wherein the substantially hollow heat sink housing includes a substantially closed front end.

17. A flashlight of claim 16, further comprising a main housing that contains the source of energy, and wherein the substantially hollow heat sink housing thermally conducts heat from the light source to the main housing.

18. A flashlight of claim 15, further comprising a current modulating circuit that delivers a thermally compensated signal to the LED light source.

19. A flashlight of claim 18, wherein said current modulating circuit includes a temperature responsive resistor that detects the heat generated by said LED light source.

* * * * *